United States Patent

Watson, Jr.

[15] 3,700,673
[45] Oct. 24, 1972

[54] 3-4-DIHYDROBENZO(B) (1,7)NAPHTHYRIDIN-1(2H)-ONES

[72] Inventor: Edward John Watson, Jr., West Chester, Pa.

[73] Assignee: Morton-Norwich Products, Inc., Norwich, N.Y.

[22] Filed: Feb. 12, 1971

[21] Appl. No.: 115,042

[52] U.S. Cl. ........260/287 R, 260/288 A, 260/288 R, 260/293.81, 424/258
[51] Int. Cl. .............................................C07d 39/00
[58] Field of Search............260/288 R, 288 A, 287 R

[56] References Cited

UNITED STATES PATENTS

| 3,232,945 | 2/1966 | Sigal | 260/288 R |
| 3,580,915 | 5/1971 | Wolf | 260/288 R |

FOREIGN PATENTS OR APPLICATIONS

| 1,022,593 | 1/1958 | Germany | 260/288 R |

OTHER PUBLICATIONS

Kempter et al., Ber., Vol 98, pp. 420– 421 (1965).
Corbett et al., Chem. Abst., Vol. 60, Col. 5471g (1964).

Primary Examiner—Donald G. Daus
Attorney—Bradford S. Allen

[57] ABSTRACT

Compounds of the formula:

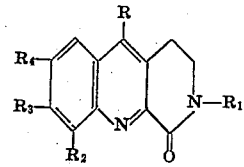

wherein R is hydroxy, phenoxy, chloro, amino, or di(lower)alkylamino (lower)alkylamino; $R_1$ is hydrogen or acetyl; $R_2$ is hydrogen or methoxy; $R_3$ is hydrogen or methoxy; and $R_4$ is hydrogen, methoxy or dimethylamino are antispasmodic agents abolishing spastic contractions and lowering hypertonicity of the ileum and colon.

14 Claims, No Drawings

3-4-DIHYDROBENZO(B) (1,7)NAPHTHYRIDIN-1(2H)-ONES

This invention relates to chemical compounds. More particularly it is concerned with certain 3,4-dihydrobenzo[b][1,7] naphthyridin-1(2H)-ones of the formula:

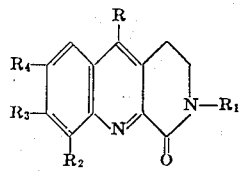

wherein R is hydroxy, phenoxy, chloro, amino or di(lower)alkylamino(lower) alkylamino; $R_1$ is hydrogen or acetyl; $R_2$ is hydrogen or methoxy; $R_3$ is hydrogen or methoxy and $R_4$ is hydrogen, methoxy or dimethylamino. These compounds are antispasmodic agents. They are capable upon intravenous administration of abolishing spastic contractions and lowering hypertonicity of the ileum and colon induced by morphine in the dog. While they share a common antispasmodic property, they differ from each other in degree of activity as might be expected. A representative member, 5-phenoxy 3,4-dihydrobenzo[b][1,7] naphthyridin-1(2H)-one, administered intravenously at a dose of from 10–20 mg/kg in a vehicle composed of 5 parts polyethylene glycol of average molecular weight 300, 3 parts of ethanol and 2 parts water to dogs counteracted spastic contractions and decreased hypertonicity of the ileum and colon induced by morphine.

The method for making the compounds of this invention consists in reacting an aniline with 2,3-dioxo-4-piperidinecarboxylate to produce a 3, 4-dihydro-5-hydroxybenzo[b][1,7]naphthyridin-1(2H)-one whose hydroxyl can be replaced by groups such as chloro in known fashion and that, in turn, by amino in conventional manner. Acetylation is accomplished with acetic anhydride or acetyl chloride.

Illustrative syntheses according to the foregoing scheme are appended in these examples:

EXAMPLE 1

A. Ethyl 2,3-Dioxo-4-piperidinecarboxylate

A few crystals of iodine and two grams of HgCl were introduced into a mixture of benzene (2 l.) and ethanol (280 ml). Sodium methoxide (108 g, 2.0 moles) was added with stirring. A mixture of 2-pyrrolidone (17.2 g, 2.0 moles) and diethyl oxalate (292 g, 2.0 moles) was introduced. Slight exothermicity was observed. The reaction mixture was refluxed for 24 hours. It was acidified with 320 ml of 1:1 HCl. The hot benzene was decanted, the salt and water were mixed with fresh boiling benzene, and the benzene was decanted. This extraction with boiling benzene was done three times. The extracts were combined and filtered by gravity. The filtrate was concentrated under reduced pressure to approximately 1.5 l. This was concentrated on a steam bath to approximately 600 ml. On cooling overnight a solid (m.p. 148°–151°) was obtained.

B. 3,4-Dihydro-5-hydroxybenzo[b][1,7]naphthyridin-1(2H)-one

In a 5 liter three-neck flask was placed 370 g (2.0 moles) of A., 186 g (2.0 moles) of aniline, 2 liters of toluene and 10 drops of concentrated HCl. The flask was fitted with stirrer, thermometer, dropping funnel and Dean-Stark trap with condenser. Water was removed by azeotropic distillation with toluene until 35.5 ml had been collected. The Dean-Stark trap was removed and the condenser was set for distillation. Toluene was distilled out of the flask while 2 liters of Dowtherm were added by means of the dropping funnel. The reaction mixture was then heated at reflux (above 250°) for 1-½ hours. Upon allowing the dark solution to cool, the product crystallized. The solid was filtered off and washed with hexane. The yield of crude product was 380 g (89 percent). The crude material was recrystallized from one liter of ethylene glycol to give 361 g (95 percent recovery).

EXAMPLE 2

2-Acetyl-3,4-dihydro-5-hydroxybenzo[b][1,7]naphthyridin-1(2H)-one

The compound of Example 1, B (50 g, 0.234 mole) was suspended in acetic anhydride (150 ml). The reaction mixture was heated to reflux and acetic acid (200 ml) was introduced. The content of the flask was refluxed for 3 hours. Acetic anhydride (30 ml) was introduced and refluxing was continued for another 3 hours. The reaction mixture was poured into ice water after cooling. The solid that formed was filtered and washed with water and ethanol. Thus 52 g, m.p. 275°–277° (Mel-Temp) were obtained. Yield: 86.6 percent. A purified sample, m.p. 292°–293°, was prepared by recrystallizing from acetic acid.

EXAMPLE 3

5-Phenoxy-3,4-dihydrobenzo [b] [1,7] naphthyridin-1(2H)-one

A 1-l. three-necked flask was equipped with reflux condenser, stirrer and thermometer. In the flask was placed 69 g (0.30 mole) of 5-chloro-3,4-dihydrobenzo [b] [1,7] naphthyridin-1(2H)-one and 460 ml of melted phenol. The solution was heated to reflux by means of a heating mantle and refluxed for 2 hours. The solution was allowed to cool and then was poured into 2 l. of cold 10 percent NaOH solution with good stirring. An additional 1.5 l. of water was added and the material was thoroughly stirred until the oil that initially formed had become a crystalline precipitate.

The tan solid was filtered off and washed with water and finally with dry ether. In this way was obtained 75 g (87 percent yield) of crude product, m.p. 247°–255°. The crude material was recrystallized with 400 ml of dimethyl-formamide (Darco) yielding 61 g, m.p. 270°–271° (partial melting 266°) (70 percent over-all yield).

EXAMPLE 4

5-Chloro-3,4-dihydrobenzo[b] [1,7] naphthyridin-1(2H)-one

In a 2-l. three-neck flask equipped with stirrer, thermometer and distilling condenser, was placed 85 g (0.39 mole) of the compound of Example 1, B. and 700 ml of $POCl_3$. The suspension was very gradually heated to 70° by means of a steam bath and maintained at this temperature for 30 minutes. The reaction mixture was allowed to cool somewhat, and excess $POCl_3$ was removed by distillation at reduced pressure.

The dark pasty residue was hydrolyzed by the rapid addition of 1,500 ml of ice water while the reaction flask was cooled by means of an ice bath. The ice bath was removed and the temperature of the reaction mixture gradually rose from 5° to 30°. At this point a water bath was used to prevent the temperature of the mixture from exceeding 30°–35°. When the exothermic reaction was over, the mixture was allowed to stir overnight. The mixture was filtered and the small amount of dark precipitate was washed with water.

The dark solution was made basic with concentrated $NH_4OH$ (500 ml), and a solid precipitated. The solid was filtered off and washed with water. The partially dry pasty solid was recrystallized from 635 ml of dimethylformamide. The recrystallized material weighed 69 g (76 percent yield), m.p. 251°–253°.

EXAMPLE 5

3,4-Dihydro-5-hydroxy-9-methoxybenzo[b][1,7]naphthyridin-1(2H)-one

A. Ethyl 3-(2-Methoxyphenylimino)-2-oxoisonipecotate

In a 1 liter Erlenmeyer flask was placed 25 g (0.2 mole) of o-anisidine and 37 g (0.2 mole) of ethyl 2,3-dioxoisonipecotate. One drop of conc. HCl was added and the mixture was heated on the steam bath for two hours. The viscous liquid was allowed to cool. The resultant solid was treated with 250 ml of hot isopropanol, the mixture was allowed to cool and then filtered. After drying overnight at 60°, the yellow solid weighed 38 g (66 percent yield), m.p. 111°–114° (with dec.).

B. 3,4-Dihydro-5-hydroxy-9-methoxybenzo[b][1,7]naphthyridine-1(2H)-one

In a 1 liter flask fitted with stirrer, reflux condenser and thermometer, was placed 38 g (0.13 mole) of the above anil and 200 ml of Dowtherm A. The suspension was rapidly heated to reflux and maintained at the reflux temperature for 45 minutes. Upon cooling, a solid formed which was filtered off and washed with absolute ethanol. The yield of crude product was 28 g (88 percent). It was purified by recrystallization from 300 ml of dimethylformamide using Darco.

EXAMPLE 6

3,4-Dihydro-7,8-dimethoxy-5-hydroxybenzo[b][1,7]naphthyridin-1(2H)-one

In a 3 liter three-neck flask equipped with stirrer, dropping funnel, thermometer and Dean-Stark trap, was placed 153 g (1.0 mole) of aminoveratrole, 185 g (1.0 mole) of ethyl 2,3-dioxoisonipecotate, 1 liter of toluene and 2 drops of conc. HCl. The reaction mixture was heated to reflux and water was removed by azeotropic distillation. After the theoretical amount of water (18 ml) had been collected in the Dean-Stark trap, the mixture was allowed to reflux for 2 hours. At this point the reaction was interrupted and the Dean-Stark trap replaced with a condenser set for distillation. Toluene was gradually distilled off while 1 liter of Dowtherm A was added to the reaction flask. The temperature of the mixture gradually rose to the boiling point of Dowtherm A (255°). The mixture was refluxed for 2 hours and then allowed to cool overnight.

The dark solid that precipitated was filtered off and washed with Dowtherm A and then with absolute ethanol. The crude material was recrystallized from 3 liters of dimethylformamide yielding 133 g (41 percent yield), m.p. 314°–318°(dec.).

Further recrystallization from acetic acid followed by recrystallization from dimethylformamide gave a m.p. 325°–327° (partial melting at 314°).

EXAMPLE 7

A. 3,4-dihydro-5-hydroxy-7-methoxybenzo[b][1,7]naphthyridin-1(2H)-one

In a 1 liter three-neck flask was placed 49 g (0.4 mole) of p-anisidine, 74 g (0.4 mole) of the compound of Example 1, A., 400 ml. of toluene and 2 drops of concentrated HCl. The flask was equipped with stirrer, thermometer dropping funnel and Dean-Stark trap with condenser. Water was removed by azeotropic distillation (7.2 ml). Dowtherm A, 400 ml, was added through the dropping funnel while toluene was distilled out of the reaction flask. The mixture was then refluxed for 1-½ hours. Upon cooling, the solid was filtered off and washed consecutively with dimethylformamide, ethanol and ether. The yield of product was 38 g (39 percent), m.p. dec. 360°.

B. 5-Chloro-3,4-dihydro-7-methoxybenzo[b][1,7]naphthyridin-1 (2H)-one

A 3 liter three-neck flask was fitted with stirrer, thermometer, Claisen adapter and distillation condenser. In the flask was placed 50 g (0.205 mole) of A. and 500 ml of $POCl_3$. This mixture was heated cautiously by means of a steam bath to 50°. The reaction became exothermic and the temperature rose to 90°. The reaction mixture was then allowed to cool to 70° and maintained at this temperature for 1 hour.

Excess $POCl_3$ was removed by distillation at reduced pressure. The residual material was decomposed by the rapid addition of 2 liters of ice water. The insoluble solid was filtered off and washed with water. The solid was placed in an Erlenmeyer flask with 1 liter of water. Concentrated HCl, 50 ml, was added. A homogeneous solution resulted. The solution was filtered, cooled and made basic with aqueous ammonia. A brown solid formed. This was filtered off, washed with water and dried yielding 60 g (theoretical yield was 54 g).

Recrystallization of this from dimethylformamide gave a material with m.p. 301°–304°.

EXAMPLE 8

2-Acetyl-5-chloro-3,4-dihydrobenzo[b][1,7]naphthyridin-1(2H)-one

In a 3 liter three-neck flask, equipped with stirrer, thermometer, Claisen adapter and distillation condenser, was placed 82 g (0.3 mole) of the compound of Example 2 and 700 ml of $POCl_3$. This mixture was allowed to stir for 1 hour during which time the temperature rose from 25° to 35°. The reaction mixture was heated to 50° (steam bath) and allowed to cool for 25 minutes. Then it was heated to 60° and allowed to cool for 1 hour. Excess $POCl_3$ was removed at reduced pressure. The solid residue was decomposed with 1,500 ml of ice water. The precipitate was filtered, washed with water and allowed to dry. Upon recrystallization from isopropanol there was obtained 40 g (48 percent yield), m.p. 196°–199°.

EXAMPLE 9

5-Amino-3,4-dihydrobenzo[b] [1,7]naphthyridin-1(2H)-one

In a 1 liter three-neck flask was placed 93 g (0.4 mole) of the compound of Example 4 and 320 ml of molten phenol. The flask was fitted with stirrer, reflux condenser, thermometer and gas addition tube. The reaction mixture was heated to 95° and ammonia was passed in until the solution was saturated. The solution was then refluxed for 4 hours (180°) while slow addition of ammonia was continued.

The solution was allowed to cool and then was poured into 1,500 ml of anhydrous ether with good stirring. The ether was decanted from the slightly sticky solid and fresh ether was added. Filtration gave 150 g of the unstable hydrochloride. This solid was suspended in 2 liters of water and stirred to form the free base, 66 g (78 percent yield).

The crude product was recrystallized from 600 ml of dimethylformamide to yield 37 g, m.p. 306°–308°.

EXAMPLE 10

A. 3,4-dihydro-7-dimethylamino-5-hydroxybenzo[b] [1,7]naphthyridin-1(2H)-one

In a 3 liter three-neck flask was placed 185 g (1.0 mole) of the compound of Example 1, A., 136 g (1.0 mole) of p-dimethylaminoaniline, 1 liter of toluene and 2 drops of concentrated HCl. The flask was fitted with stirrer, addition funnel, thermometer and Dean-Stark trap with condenser. The mixture was heated by means of a heating mantle and water was removed by azeotropic distillation. Two hours were required to remove the theoretical amount of water (18 ml).

The Dean-Stark trap with condenser was removed and replaced by a condenser set for distillation. One liter of Dowtherm A was gradually added to the reaction flask while toluene was removed by distillation. The mixture was then refluxed (255°) for 1-½ hours. It was then allowed to cool to 40°. The solid that formed was filtered off and washed first with benzene and then with ethanol. The dried brown solid weighed 205 g (80 percent Yield) m.p. 316°–318° (dec.).

Recrystallization of 40 g of the crude solid from 750 ml of dimethylformamide gave 26 g (65 percent recovery), m.p. 316°–318°(dec.).

B. 5-Chloro-7-dimethylamino-3,4-dihydrobenzo[b][1,7] naphthyridin-1(2H)-one

A 2 liter three-neck flask was fitted with stirrer, reflux condenser and thermometer. In the flask was placed 170 g (0.66 mole) of A. and one liter of POCl₃. The stirred suspension was slowly heated to 70°. At this point the reaction appeared to be exothermic, the temperature going to 85° after removal of the heat source (steam bath). The reaction mixture became viscous. After the temperature returned to 70°, heating was used to maintain this temperature for 45 minutes.

Excess POCl₃ was distilled out of the reaction flask under reduced pressure. To the residual solid was added 2 liters of ice water. The material turned a dark red color and appeared partially to dissolve. The mixture was filtered and the filtrate was made basic with NH₄OH. The solid was formed was filtered off, washed with water and allowed to dry giving 255 g of dark red solid.

This solid was dissolved in hot water, treated with Darco and filtered hot. To the filtrate was added concentrated NH₄OH until basic. The yellow precipitate that formed was filtered off. Recrystallization from dimethylformamide gave a m.p. (dec.) 307°.

C. 5-Amino-3,4-Dihydro-7-dimethylaminobenzo[b]f [1,7] naphthyridin-1(2H)-one

Ninety-four g (0.34 mole) of B. was placed in a 2 liter three-neck flask equipped with stirrer, thermometer, reflux condenser and ammonia gas inlet tube. To the flask was added 675 ml of molten phenol. The suspension was heated to 100° and saturated with gaseous ammonia. The temperature was then gradually raised to 180° (refluxing phenol). The reaction mixture was maintained at this temperature for 4-½ hours while a slow stream of ammonia was passed through.

The reaction mixture was then cooled to room temperature and poured into two liters of ether (vigorous stirring). The solid that formed was filtered and washed well with ether. The precipitate was dissolved in water and a small amount of insoluble material was filtered off. The filtrate was made basic with ammonia. The resulting precipitate was filtered off and washed with water giving 86 g (96 percent yield).

Recrystallization from dimethylformamide gave m.p. 335°–337° with dec.

EXAMPLE 11

3,4-Dihydro-5-(2-dimethylaminoethylamino)benzo[b][1,7] naphthyridin-1(2H)-one

In a 1 liter one-neck flask was placed 46 g (0.2 mole) of the compound of Example 4, 53 g (0.6 mole) of N,N-dimethylethylenediamine and 500 ml of dimethylformamide. The mixture was refluxed for 24 hours. Dimethylformamide and the excess di-amine was removed on a rotary evaporator yielding a dark oil. This oil was dissolved in water and some aqueous ammonia was added. Any solid that formed at this point was filtered off. The water layer was extracted with chloroform in three 100 ml portions. The chloroform was removed by distillation leaving a dark oil. To this oil was added 250 ml of isopropanol. A yellow solid soon appeared. This was filtered off, washed with isopropanol and dried yielding 16 g (21 percent).

Recrystallization of 38 g of this product from isopropanol (20–25 mg/g) yielded 28 g. m.p. 206°–210°.

EXAMPLE 12

5-Amino-3,4-dihydro-7-methoxybenzo[b][1,7] naphthyridin-1 (2H)-one

In a 3 liter three-neck flask, equipped with stirrer, thermometer, reflux condenser and ammonia gas inlet tube, was placed 57 g (0.218 mole) of the compound of Example 7, B. and 360 ml of molten phenol. This mixture was heated to 100° and saturated with gaseous ammonia. The reaction mixture was then heated to reflux (180°) and maintained at this temperature for 5 hours while a slow stream of gaseous ammonia was being added. The reaction mixture was then cooled to room temperature and poured into 2 liters of anydrous ether (vigorous stirring). The solid that formed was filtered off and washed with ether. This solid was then added to 1 liter of water with stirring. A precipitate soon appeared. After about 20 minutes the precipitate was filtered off, washed with water and dried yielding 48 g (85 percent).

Recrystallization of this material from 400 ml of dimethylformamide gave 25 g, m.p. 333°-337° dec.

EXAMPLE 13

5-(3-Diethylaminopropylamino)-3,4-dihydrobenzo[b]d[1,7] naphthyridin-1(2H)-one

In 1 liter round bottom flask was placed 46 g (0.2 mole) of the compound of Example 4, 78 g (0.6 mole) of N, N-diethyl-1,3-propanediamine and 200 ml of ethyl cellosolve (2-ethoxy-ethanol). The mixture was refluxed overnight (18 hours). The reaction mixture was cooled giving a voluminous solid. Enough isopropanol was added so that the gelatinous solid could be broken up and filtered. The white solid so obtained, 8 g, was shown by IR to be a hydrochloride of the starting diamine and so was discarded.

The filtrate was concentrated on a rotary evaporator to a dark viscous residue. About 500 ml of water was added. Some material dissolved leaving a mushy solid. The mixture was filtrated and the solid washed with water. When this solid was treated with isopropanol, it completely dissolved. Concentration of the isopropanol solution on the rotary evaporator and triturating the residue with ethyl acetate gave 5.5 g of free base (8.4 percent yield).

The aqueous solution was extracted with three 250 ml portions of chloroform. Concentration in the rotary evaporator gave a thick, very viscous liquid. About 300 ml of water was added and this was removed by way of the rotary evaporator so that residual diamine starting material might be eliminated by steam distillation. Addition of 250 ml of isopropanol to the viscous residue and seeding gave 15 g of a yellowish solid (23 percent yield) m.p. 170°-174°.

Concentration of the isopropanol filtrate and trituration of the residual material with ether and then with ethyl acetate gave an additional 5 g of product (7.7 percent yield). Total yield was 25 g (38 percent).

The free base was recrystallized from isopropanol (16 ml/g) to give a 70 percent recovery of purified free base, m.p. 174°-176°.

What is claimed is:
1. A compound of the formula:

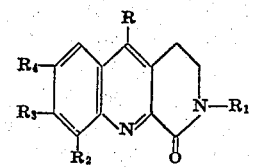

wherein R is hydroxy, phenoxy, chloro, amino, or di(lower)alkylamino(lower) alkylamino; $R_1$ is hydrogen or acetyl; $R_2$ is hydrogen or methoxy; $R_3$ is hydrogen or methoxy; and $R_4$ is hydrogen, methoxy or dimethylamino.

2. The compound of claim 1 wherein R is hydroxy and $R_1$, $R_2$, $R_3$ and $R_4$ are hydrogen.

3. The compound of claim 1 wherein R is hydroxy, $R_1$ is acetyl and $R_2$, $R_3$ and $R_4$ are hydrogen.

4. The compound of claim 1 wherein R is phenoxy, and $R_1$, $R_2$, $R_3$ and $R_4$ are hydrogen.

5. The compound of claim 1 wherein R is chloro and $R_1$, $R_2$, $R_3$ and $R_4$ are hydrogen.

6. The compound of claim 1 wherein R is hydroxy, $R_2$ is methoxy and $R_1$, $R_3$ and $R_4$ are hydrogen.

7. The compound of claim 1 wherein R is hydroxy, $R_3$ is methoxy and $R_1$, $R_2$ and $R_4$ are hydrogen.

8. The compound of claim 1 wherein R is chloro, $R_4$ is methoxy and $R_1$, $R_2$ and $R_3$ are hydrogen.

9. The compound of claim 1 wherein R is chloro, $R_1$ is acetyl and $R_2$, $R_3$ and $R_4$ are hydrogen.

10. The compound of claim 1 wherein R is amino and $R_1$, $R_2$, $R_3$ and $R_4$ are hydrogen.

11. The compound of claim 1 wherein R is amino, $R_4$ is dimethylamino and $R_1$, $R_2$ and $R_3$ are hydrogen.

12. The compound of claim 1 wherein R is dimethylaminoethylamino and $R_1$, $R_2$, $R_3$ and $R_4$ are hydrogen.

13. The compound of claim 1 wherein R is amino, $R_4$ is methoxy and $R_1$, $R_2$ and $R_3$ are hydrogen.

14. The compound of claim 1 wherein R is dimethylaminoethylamino and $R_1$, $R_2$, $R_3$ and $R_4$ are hydrogen.

* * * * *